United States Patent [19]
Robinson

[11] Patent Number: 4,930,973
[45] Date of Patent: Jun. 5, 1990

[54] TILTABLE TAILGATE LIFT

[75] Inventor: Morris D. Robinson, Redondo Beach, Calif.

[73] Assignee: Waltco Truck Equipment Co., Inc., Gardena, Calif.

[21] Appl. No.: 331,335

[22] Filed: Mar. 30, 1989

[51] Int. Cl.$^5$ ............................................. B60P 1/44
[52] U.S. Cl. ...................................... 414/557; 414/917
[58] Field of Search .............. 414/546, 556, 557, 558, 414/917

[56] References Cited

U.S. PATENT DOCUMENTS

| | | | |
|---|---|---|---|
| 2,626,067 | 1/1953 | Berford et al. | 414/557 |
| 2,725,152 | 11/1955 | Gwinn, Jr. | 414/557 |
| 2,774,494 | 12/1956 | Malmström | 414/557 X |
| 3,138,270 | 6/1964 | McCarty | 414/558 |
| 3,369,679 | 2/1968 | Robinson | 414/458 |
| 3,602,381 | 8/1971 | Size et al. | 414/557 |
| 3,630,395 | 12/1971 | Bunge | 414/546 |
| 3,638,811 | 2/1972 | Robinson | 414/558 |
| 3,842,997 | 10/1974 | Sprikkelman | 414/557 |
| 3,977,544 | 8/1976 | D'Hollander | 414/557 X |
| 4,111,317 | 9/1978 | Robinson | 414/557 X |
| 4,147,261 | 4/1979 | Dautel et al. | 414/557 |

Primary Examiner—David A. Bucci
Attorney, Agent, or Firm—Donald D. Mon

[57] ABSTRACT

A platform lift mountable to a vehicle, which includes a platform that can remain horizontal while lifting and can tilt to faciltate loading and unloading of the platform. The lift includes a linkage pivotally mounted to the base frame, and the linkage includes a base leg, a platform leg, a lift arm, and a reference arm. In a lift/lower mode the legs and the arms form a parallelogram system that will maintain the platform in a level horizontal arrangement. In a tilt mode, the upper arm is extensible in order to change the geometry from a parallelogram to a quadrilateral with equal legs and unequal arms.

10 Claims, 5 Drawing Sheets

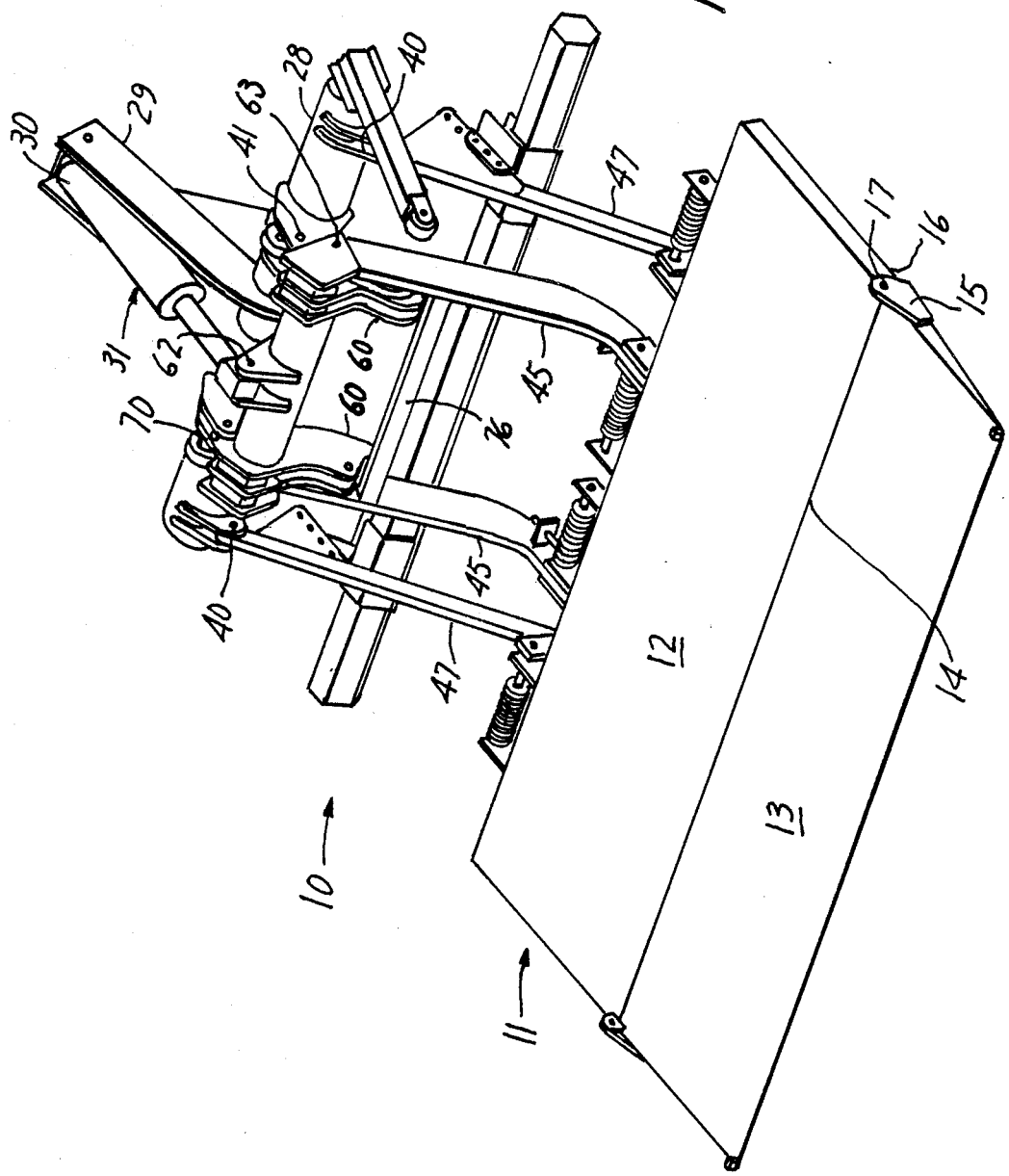

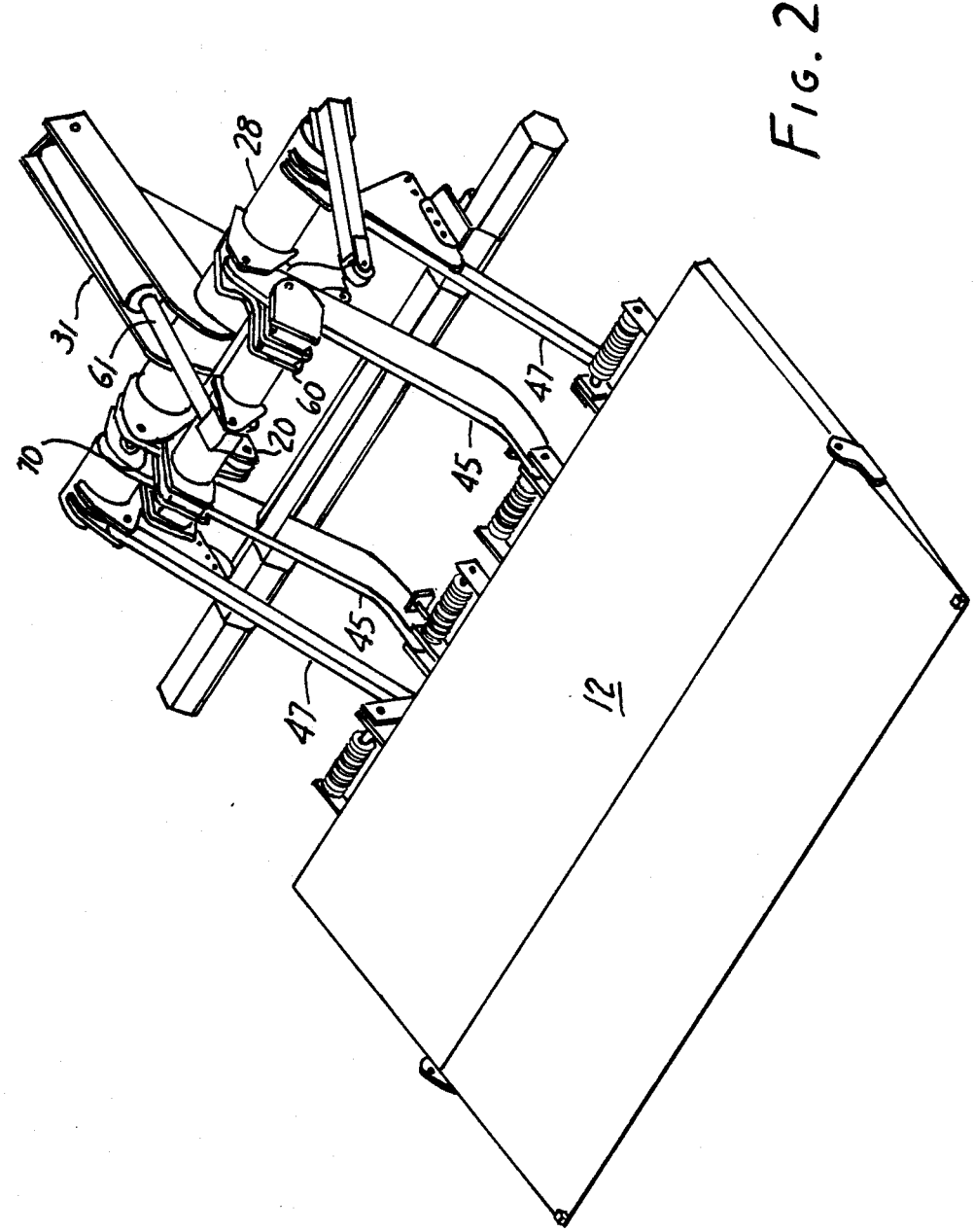

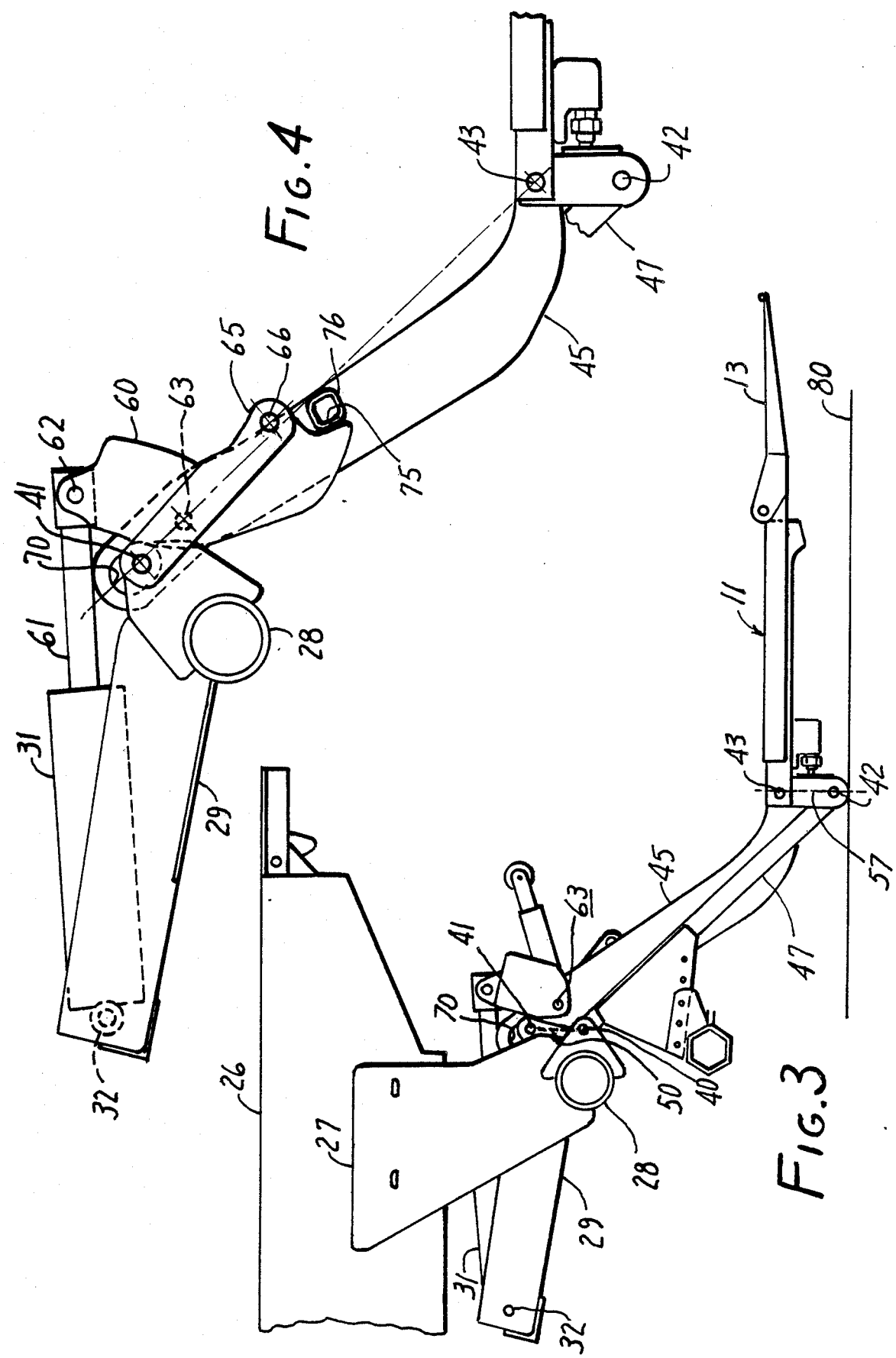

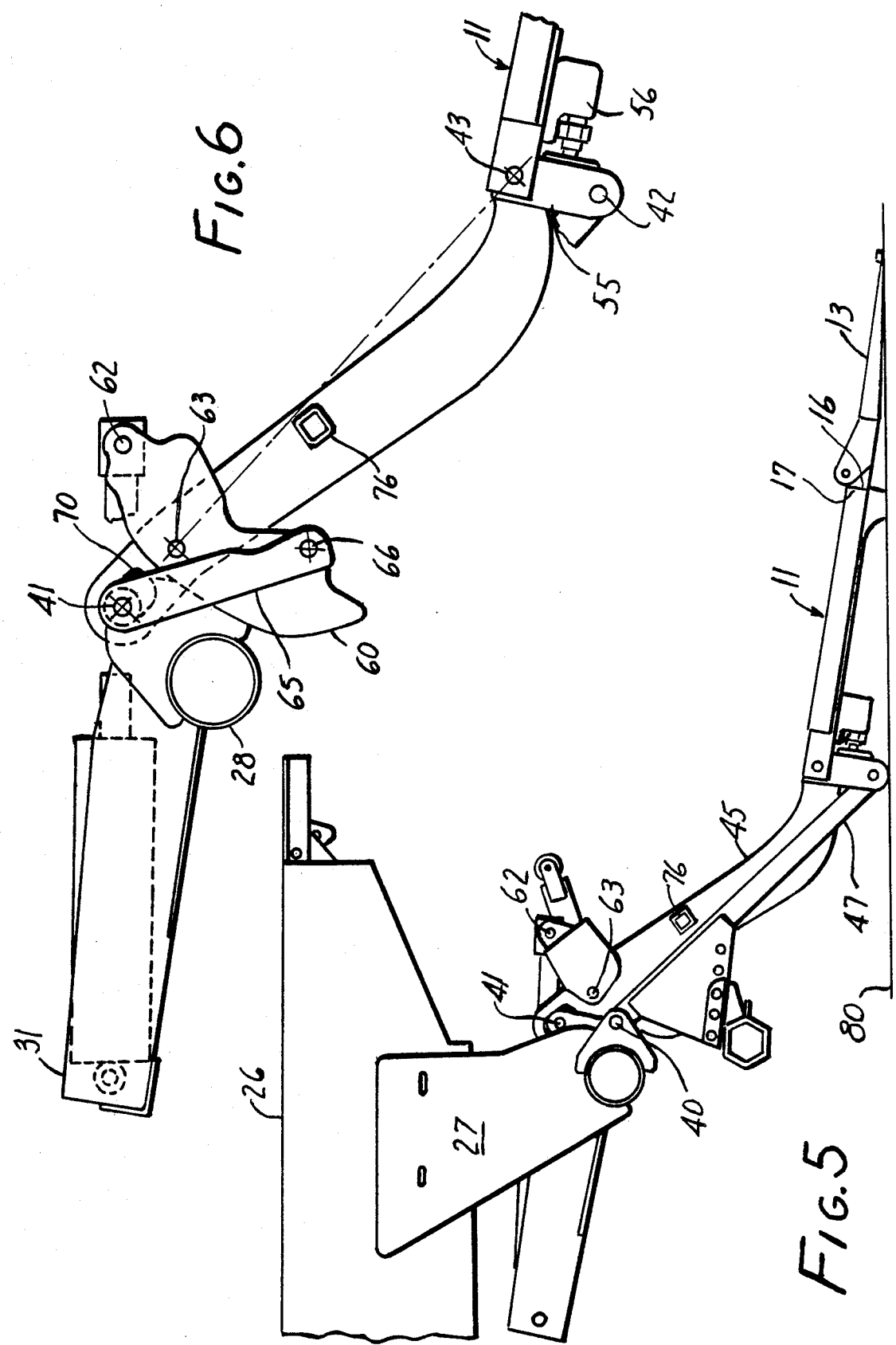

TILTABLE TAILGATE LIFT

FIELD OF THE INVENTION

This invention relates to tailgate lifts for vehicles, and particularly to lifts which can remain horizontal while lifting and lowering, and which can tilt to facilitate loading or unloading of the platform.

BACKGROUND OF THE INVENTION

Tailgate lifts for vehicles are a well-recognized and well-developed art. They are customarily mounted to the rear end of a truck, often in place of its tailgate. Their function is to provide a platform that can be raised and lowered. Articles to be loaded are placed on the platform at a lower elevation. The platform is raised to the level of the truck. The article can then be moved onto the truckbed. Unloading articles is the reverse procedure. The energy to raise the articles is provided by some motive means, usually a hydraulic piston-cylinder rod assembly.

Lifts are known whose platforms are tilted up against the truck frame to act as a tailgate. Others are known which fold beneath the truckbed.

Because of the physical structure that is involved, the platform level in its lowermost position is invariably above the adjacent round level. To facilitate placing the articles on the platform and removing them, a ramp is usually mounted to the edge of the platform. Then a hand truck can more conveniently be run up to or down from the platform.

However such ramps are usually quite short and it can be an inconvenience to go too quickly from an upper level to a lower level or from a lower lever to an upper level in a short distance. Also, some loads are not amenable to this kind of handling.

A more convenient platform loading or platform unloading technique is to have the platform tilt itself. Platform tilting is in fact known, but is not common in the United States. One reason that platform tilting has not become popular is because a lift that provides it must function in two different modes (lift/lower, and tilt). It is necessary not only to provide means to power the lift in both modes, but to assure that the modes will not become confused.

Further, because trucks park where they must, it is not acceptable for a lift to be operable in the tilt mode only at some single defined elevation of the platform. The elevation relative to the truck is ranted and constant. But the elevation of the pavement or of a loading dock may vary relative to the platform, and usually will.

- It is an object of this invention to provide a tailgate lift that can operate in either mode at any level, but never in both modes simultaneously.

Tailgate lifts, while not inherently dangerous, still function to lift, lower and transfer appreciable loads, and are operated by personnel having various degrees of ability and awareness. For this reason the mechanism must be simple, rugged, and reliable. The more complication there is, the more there is to go wrong. Complicated mechanisms are one of the reasons why tilting tailgate mechanisms have not achieved the acceptance which the convenience they provide should justify.

Accordingly, another object of this invention is to provide a tiltable lift with suitable exclusivity of function and simplicity of construction.

This invention also is intended to offer additional advantages over known tilting tailgate lifts. For example, known lifts generally use an upper platform pivot around which the tilting action occurs. When this is the situation, the lower platform pivot must scrape along the ground and the resulting friction forces can even frustrate the tilting movement, especially if the platform is heavily loaded. In the instant invention, the platform tilts around the bottom platform pivot, and there is no frictional reaction with the ground.

As a further example, in known tiltable lifts which are powered by hydraulic piston/cylinder assemblies, a hydraulic leak not only enables the platform to lower, but also enables it to tilt. This is not the situation in the instant invention. In the instant invention a hydraulic leak will permit the platform to lower, but not to tilt. Tilting of the instant system requires a positive control and drive. Thus, a hydraulic leak cannot result in a tilt of the platform.

As still another advantage, because the tilting action requires a positive control, namely the positive drive of a linkage, the rate of tilting can both be controlled and limited. Tilting need never be abrupt.

BRIEF DESCRIPTION OF THE INVENTION

A tailgate lift according to this invention includes a load-bearing platform. The object of the invention is to raise and lower the platform and under certain circumstances to tilt it downwardly to facilitate loading and unloading articles onto and from the platform.

The lift is attached to the frame of a vehicle, usually a truck, and includes a linkage that links the platform to the frame, and is adapted to manipulate the platform either in its lift/lower mode, or in its tilt mode, but never simultaneously.

Power means is provided to power the linkage. There is no limitation on the type of power means which can be used. Most frequently it will be a hydraulic cylinder/piston rod device, because these are rugged and readily adapted to vehicular uses.

The linkage is pivotally mounted to the frame. It includes a base leg, a platform leg, a lift arm, and a reference arm. In the lift/lower mode the legs and the arms form a parallelogram system that will maintain the platform in a level, usually horizontal, alignment. In the tilt mode. The upper one of the arms is extensible in order to change the geometry from a parallelogram to a quadrilateral with equal legs and unequal arms. This results in downward tilting of the platform. The platform is returned to level by restoring the equality of the length of the arms.

According to a preferred but optional feature of the invention, a driver drives the lift arm in its lifting direction and is followed by the lift arm in its lowering direction.

According to yet another preferred but optional feature of the invention, a tilt link is driven by the driver in such a way that in the lowering direction when the arms are restrained against further downward movement, for example by resting upon a curb, platform or street, or by being otherwise prevented from lowering, the driver when further driven will drive the tilt link to enable the extension of the lift's upper arm and thereby tilt the platform , but not unless it is driven.

According to yet another preferred but optional feature of the invention, the tilt link and the driver are so disposed and arranged that unless the arms are restrained from lowering and the driver is also positively and properly driven, an over-center arrangement exists and continues to exist that forbids a tilting movement of the platform.

The above and other features of the invention will be fully understood from the following detailed description and the accompanying drawings: in which:

BRIEF DESCRIPTION OF THE DRAWINGS

FIG. 1 is an isometric view of the preferred embodiment of the invention in its lowermost lift/lower mode position;

FIG. 2 is an isometric view of the lift of FIG. 1 in its lowermost tilt mode position;

FIG. 3 is a side view of the lift of FIG. 1;

FIG. 4 is a fragmentary view of FIG. 3 for explanation purposes;

FIG. 5 is a side view of the lift in FIG. 2;

FIG. 6 is a fragmentary view of FIG. 5 for explanation purposes;

DETAILED DESCRIPTION OF THE INVENTION

Figure 7:
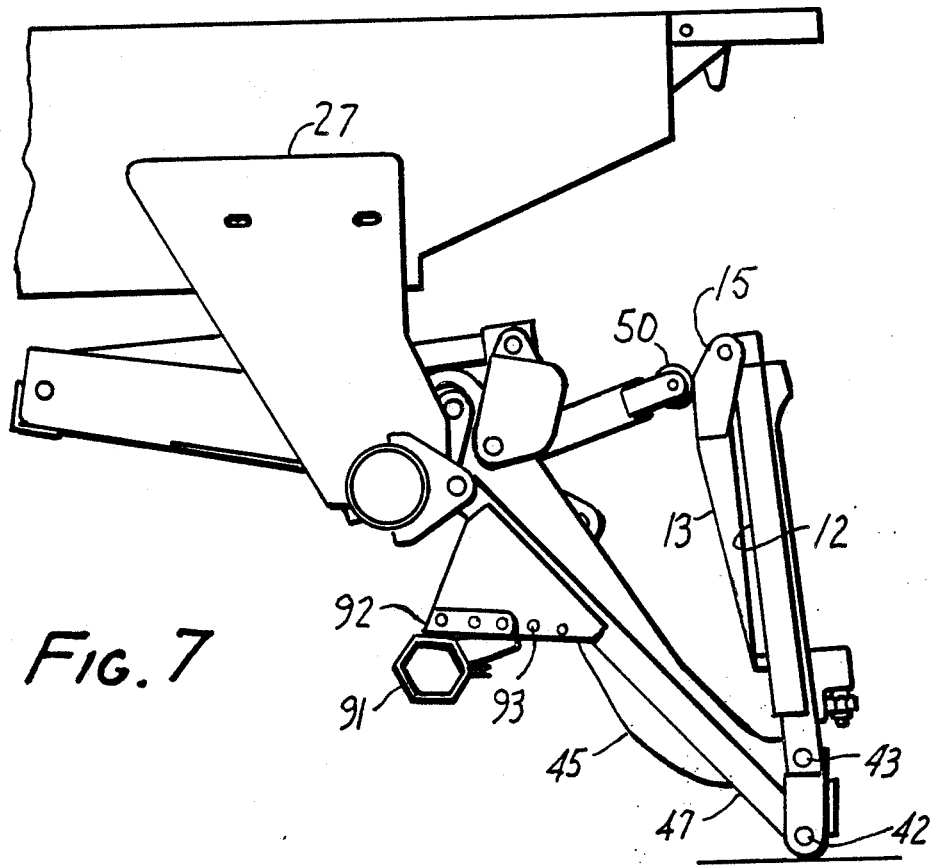
FIG. 7 is a fragmentary side elevation showing the start of the storage of the platform.

FIG. 1 shows the presently-preferred embodiment of a lift 10 according to this invention. The lift include a load-carrying platform 11 whose manipulation is the subject of this invention. It has a flat upper load carrying area 12 which is intended to remain level relative to the truck. A ramp 13 (which may be considered a platform extension) is pivotally mounted to edge 14 of the platform by hinges 15. The hinges are located at an upper level so that abutting edges 16, 17 of the ramp and platform meet to hold the ramp level with area 13 when unsupported from below. As shown in FIG. 2, edges 16 and 17 can be separated to enable the platform to fold or to "break" at this hinge if necessary. The ramp tilts upwardly relative to area 12 for this purpose.

These installations are relatively heavy and massive. While only one set of linkages is geometrically required for actuation and control, a larger arrangement may be provided, wherein elements of at least two sets of linkages will be used. Because they are alike, parts of each will be referred to herein, noting the duplication. If only one set was used, such as for a lighter lift, only one half the number illustrated would be used.

As best shown in FIG. 3, the lift is conveniently mounted to a truckbed 26 by a bracket 27. Bracket 27 is the primary attachment, which supports a tubular base 28. A secondary bracket 29 on base 28 supports one end 30 of a cylinder/piston rod assembly 31. The connection of assembly 31 to bracket 29 is pivotal, by a hinge pin 32.

In reading this specification, the reader should keep in mind that in the lift-lower mode the system is biased downwardly by the weight of the linkage and platform. In the tilt mode, the platform is biased downwardly by its own weight.

Also, it is helpful to observe that in the practical construction shown in FIG. 1, the arms and legs do not lie in the same plane. They still operate in the described manner, because they are hinged to rigid structures such as the base or the platform, which cause the parallelogram or tilting geometry to be maintained.

The linkage of this invention includes four pivot points as follows:

lower base pivot 40 on an ear fixed to base 28
upper base pivot 41 on an ear fixed to base 28
lower platform pivot 42
upper platform pivot 43

The linkage itself includes:

a lift arm 43 hinged to the upper platform pivot 42 and to the upper base pivot 41 a reference arm 47 hinged to the lower base pivot 40 and to the lower platform pivot 42.

The platform pivots are on a block 55 to which the platform is hinged. The arms are in effect hingedly mounted to the platform. A stop block 55 holds the platform aligned relative to the block during lift/lower and tilt mode operations. It enables the platform to be folded Over for storage. For definition purposes the block will be treated as part of the platform.

The base pivots are on the base (on ears on the base) so the arms are hingedly connected to the base.

Thus there is created a quadrilateral geometric structure. The structure includes the arms between their respective pivots, base leg 50, which is the spacing seen in side view in FIG. 3 between the base pivots, and a platform leg 51 which is the spacing between the platform pivots.

The lengths of the two legs are always equal. In the lift/lower mode, the lengths of the arms will be equal, and the quadrilateral will be a parallelogram. Then the platform will remain level as it raises and lowers.

In the tilt mode, the effective length of the lift arm between its pivots will be increased. Then the structure is no longer a parallelogram, but instead is a quadrilateral with a longer upper arm than lower arm, and with two equal legs. A tilting of the platform will result.

Figure 8:
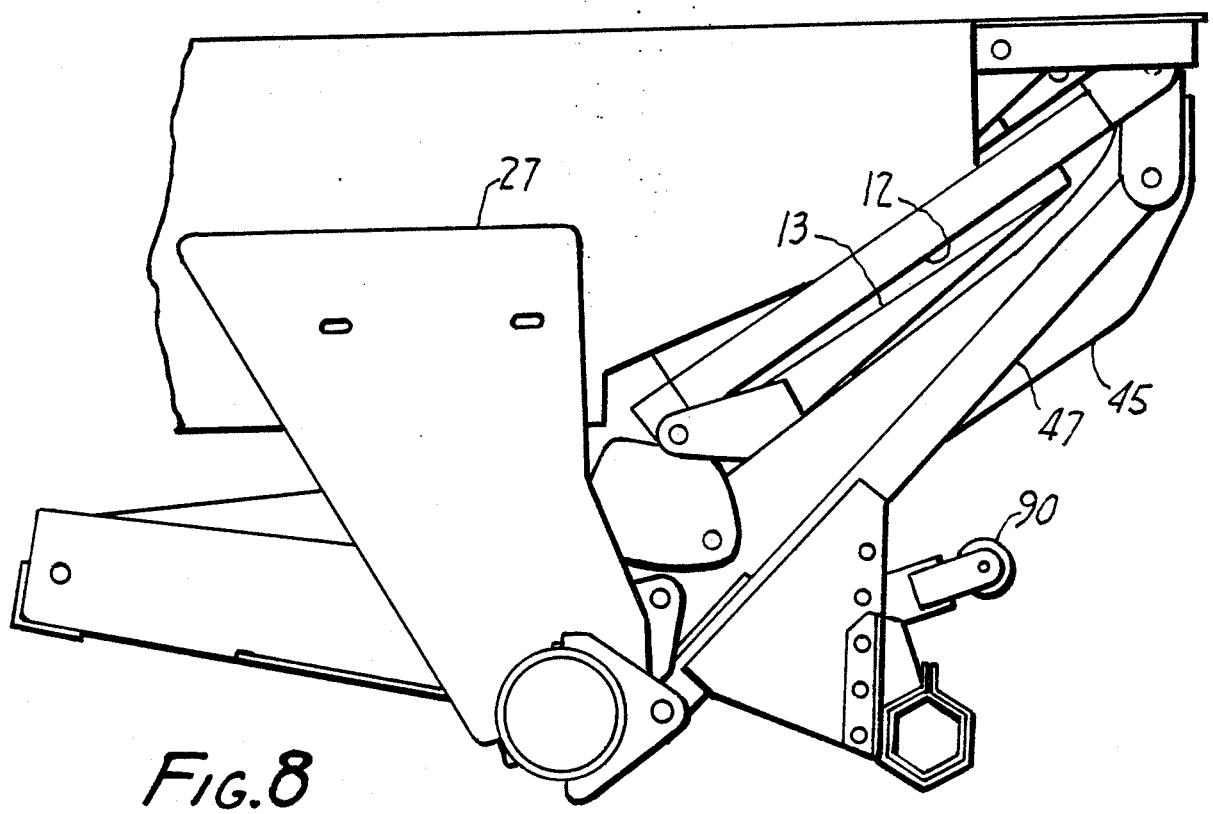
FIG. 8 is a fragmentary side elevation showing the platform in its stored condition.

To this point it is evident that in the lift/lower mode shown in FIGS. 1, 8 and 4, all that is needed to raise the platform is to lift on lift arm 45. This can be done in any desired manner, but the preferred embodiment, which also powers the tilt mode will now be described.

A driver 60 is hingedly pinned to piston rod 61 by pin 62. It is a plate of substantial strength and dimensions. It is pivoted to lift arm 45 by a prime pivot 63.

A tilt link is hingedly pinned to driver 60 by a pivot pin 66 (sometimes called a "second pivot"). Tilt link 65 is hinged to upper base pivot 41. The tilt link thereby rotates around upper base pivot 41.

Lift arm 45 has an elongated extension slot 70 in which the upper base pivot 41 is fitted. The diameter of pivot 41 is about equal to the width of the slot. The slot is longer than this diameter to enable the lift arm to move in order to elongate. The lift arm's dimension between upper base pivot 41 and upper platform pivot 43 can be varied. The ends of the slot are radiused so the pivot can fit snugly against them as will later be seen.

A drive face 75 is formed on the driver which faces an engagement member 76 that is a rigid part of the lift arm 45. In FIG. 1 this engagement member is an extended bar or tubing connecting the two lift arms.

The operation of this device will now be descried.

In FIGS. 1, 3 and 4, the lift is shown in the lowermost elevation of the lift/lower mode. From this arrangement the platform can be lifted in a level position, or it ca be driven into the tilt mode.

The lift mode operated as follows. The power means is actuated to draw piston rod 61 into the cylinder, rotating the driver counterclockwise in FIGS. 3 and 4. This presses drive face 75 against engagement member 76. The lower end of tilt link 65 has swung upwardly. This has become an over-center toggle lock. As can be seen by comparing FIGS. 4 and 6, the upward movement of the tilt link will have forced the prime pivot 63 toward upper base pivot 41 (remembering that the tilt link is hinged to pivot 41), and hen it has one over center, the lower end of extension slot 70 bears against upper base pivot 41. The length of the lift arm between its pivots is then made equal to the length of the reference arm between its pivots. Parallelogram action is assured.

Furthermore, so long as the relationship in FIGS. 1, 3 and 4 exists, at an elevation, the parallelogram arrangement is locked in. Notice in side view that a line between upper base pivot 41 and prime pivot 63 is below pivot 66 which joins the tilt link and the driver. Downward force on the platform will only make the slot engagement tighter. This is a substantial safety feature which guarantees that the platform will not go into the tilt mode while operating in the lift/lower mode. It should be kept in mind that hen the platform is lowered by extending cylinder rod 81, the weight of the platform exerted on driver face 75 will prevent relative rotation between the driver and the lift arm unless and until the tilt link is driven over center into the tilt mode.

To go into the tilt mode, the toggle lock exerted by the tilt link must be overcome. This requires clockwise rotation of the driver 60 as viewed in FIG. 3. This can be done by supporting the lift arm from below while extending piston rod 61.

The usual support for this purpose occurs when the platform rests on the ground. An advantage of this invention is that it can occur at other elevations, also, but only if the driver is driven. For example if the platform overlays a curb or a side structure, the effect is the same and the platform can be tilted.

See FIGS. 2, 5 and 6, which show the platform in the tilt mode, fully tilted. With the platform on the ground 80, rod 61 has been extended. The driver drives the tilt link over center, and in so doing, the linked arrangement best shown in FIG. 6 has allowed the slot to move along the upper base pivot 41. This elongates the effective length of the lift arm, and the platform leg 51 leans. The base leg 50 remains fixed.

Return to horizontal and into the lift/lower mode is accomplished by retracting rod 61 to move the tilt link over center, restoring the parallelogramism of the lift arm.

Because of the over center arrangement. The tilt mode cannot be operated unless the arm system is supported from below. The arrangement is one of rugged simplicity.

It should be observed that the tilting action occurs around the lower platform pivot 42, so that in tilting, the bottom contact with the ground is principally a rotating one, rather than a scraping one. This significantly improves the wear qualities of the lift.

It should also be noted that in the lift/lower configuration the contact of drive face 7 and engagement member 76 make a rigid driving connection to raise the structure. However, the leverage is that between the rod and upper base pivot 41, around which the lift arm rotates.

It should be recognized that power can be applied at places other than directly to the lift arm to operate this system, so that directly powering the lift arm is not a limitation on the invention. Also, the tilt mode mechanism can be adapted to systems in which the lift/lower power is supplied by means other than a piston-cylinder assembly.

The folding and storing action is shown in FIGS. 7 and 8. In FIG. 7 the ramp has been folded out onto the platform 12 and this assembly has been manually lifted to the illustrated position. An unfolder member 90 snubs the platform and especially the ramp 13 so it does not fall over onto the lift arm when the platform is in the illustrated position, and it holds the platform and ramp folded while the lift arms raise to the stored position. When platform is to be unfolded. The platform will be held folded and will be raised to the alignment shown in FIG. 7.

When the device is to be unfolded, the lift arm is lowered and the unfolder member restores the platform to the vertical position of FIG. 7 (when the lift arm reaches the illustrated position).

Unfolder 90 is hingedly mounted. Its lowest permitted position is shown in the FIGS. However, a bumper 91 is mounted to the reference arms, and can adjustably be positioned by moving its mounting bracket 92 to different ones of holes 93. In some of the upper positions (FIG. 8) the unfolder must pivot upwardly to accommodate the bumper's upper position. This does not affect the operation of the unfolder, because at all operative times it has again reached the illustrated position, namely its lowermost position.

This invention is not to be limited by the embodiment shown in the drawings and described in the description, which is given by way of example and not of limitation, but only in accordance with the scope of the appended claims.

I claim:

1. A tiltable lift for raising and lowering articles form a lower level to an upper level which corresponds to a vehicle bed, and selectably operable in a lift/lower mode and in a tilt mode, said lift being mounted to the vehicle and comprising:

a base attachment to said vehicle;

a platform having an upper area to carry articles;

an upper base pivot and a lower base pivot on said base, defining a base leg between said upper base pivot and said lower base pivot;

an upper platform pivot and a lower platform pivot on said platform, defining a platform leg between said upper platform pivot and said lower platform pivot, lengths of said base and platform legs being substantially equal, said platform being attached to said platform leg;

a rigid reference, having a length, arm pivotally mounted to said lower base pivot and to the lower platform pivot, defining a reference length between said lower base pivot and said lower platform pivot;

a rigid lift arm pivotally mounted to said upper base pivot and to said upper platform pivot enabling an effective length of the lift arm between said upper base pivot and upper platform pivot to be varied between a length substantially equal to said reference length respective to parallelogram operation in said lift/lower mode in which effective lengths of said arms are substantially equal and said platform is maintained substantially level, and a longer length respective to quadrilateral operation in said tilt mode in which said platform is tilted because said effective arm lengths are substantially unequal;

a rigid tilt link pivotally mounted to said upper base pivot;

a driver rotatably mounted to said lift arm at a prime pivot and to said tilt link at a second pivot on said tilt link, said prime pivot, second pivot, and upper base pivot being so disposed and arranged that when the platform is substantially level and in its lift/lower mode, a line drawn through said upper base pivot and said prime pivot passes beneath said second pivot whereby said tilt link forms an over-center toggle which forces an end of a slot against said upper base pivot and establishes the effective length of the lift arm substantially equal to the length of the reference arm, and when said driver is rotated from the substantially level position, said second pivot crosses said line and the tilt link enables the lift arm to elongate between the upper base pivot and the upper platform pivot whereby to enable the platform to tilt; and power means to rotate said driver.

2. A lift according to claim 1 in which said lift arm bears an engagement member, and said driver bears a drive face adapted to be forced against said engagement member when rising the platform, to recede from said engagement member when lowering the platform, and to separate from said engagement member when one of said arms is impeded from downward movement during the tilt mode.

3. A lift according to claim 2 in which said power means is further adapted to rotate said driver around said prime pivot to press said drive face against said engagement member to raise said lift arm.

4. A lift according to claim 3 in which said power means comprises a linear actuator pivotally connected to said driver and to said base.

5. A lift according to claim 2 in which said drive face contacts said engagement member and also said second pivot is in said over-center position when the lift changes from said lift/lower mode to said tilt mode, and from said tilt mode to said lift/lower mode, this contact ceasing upon substantial rotation of said driver from said contact position.

6. A lift according to claim 1 in which said platform is pivotally mounted to said platform leg to enable the platform to be folded for storage.

7. A lift according to claim 1 in which a vehicular bumper is suspended by and beneath said reference arms to form a barrier when said arms are fully raised.

8. A tiltable lift for raising and lowering articles from a lower level to an upper level which responds to a vehicle bed, and selectably operable in a lift/lower mode and in a tilt mode, said lift being mounted to the vehicle and comprising:

a base for attachment to said vehicle;

a platform having an upper area to carry articles;

an upper base pivot and a lower base pivot on said base, defining a base leg between said upper base pivot and said lower base pivot;

an upper platform pivot and a lower platform pivot on said platform, defining a platform leg between said upper platform pivot and said lower platform pivot, lengths of said base and platform legs being substantially equal, said platform being attached to said platform leg;

a rigid reference arm, having a length pivotally mounted to said lower base pivot and to the lower platform pivot, defining a reference length between said lower base pivot and said lower platform pivot;

a rigid lift arm pivotally mounted to said upper base pivot and to said upper platform pivot, said lift arm having means engaging said upper base pivot enabling an effective length of the lift arm between said upper base pivot and upper platform pivot to be varied between a length substantially equal to said reference length respective to parallelogram operation in said lift/lower mode in which effective lengths of said arms are substantially equal and said platform is maintained level, and a longer length respective to quadrilateral operation in said tilt mode in which said platform is tilted because said effective arm lengths are unequal;

a rigid tilt link pivotally mounted to said upper base pivot;

a driver rotatably mounted to said lift arm at a prime pivot and to said tilt link at a second pivot on said tilt link, said prime pivot, second pivot, and upper base pivot being so disposed and arranged that when the platform is substantially level and in said lift/lower mode, a line drawn through said upper base pivot and said prime pivot passes beneath said second pivot whereby said tilt link forms an over-center toggle which forces said means engaging said upper base pivot against said upper base pivot and establishes the effective length of the lift arm substantially equal to the length of the reference arm, and when said driver is rotated from said substantially level position, said second pivot crosses said line and the tilt link enables the lift arm to elongate between the upper base pivot and the upper platform pivot whereby to enable the platform to tilt; and power means to rotate said driver.

9. A lift according to claim 1 in which said power means is a piston-cylinder assembly which retracts a piston when the lift is raised and folded.

10. A lift according to claim 1 in which first contact with a surface on lowering, and contact with said surface while tilting occurs at the lower platform pivot so the platform does not drag along the surface while the platform is tilted.

* * * * *